UNITED STATES PATENT OFFICE.

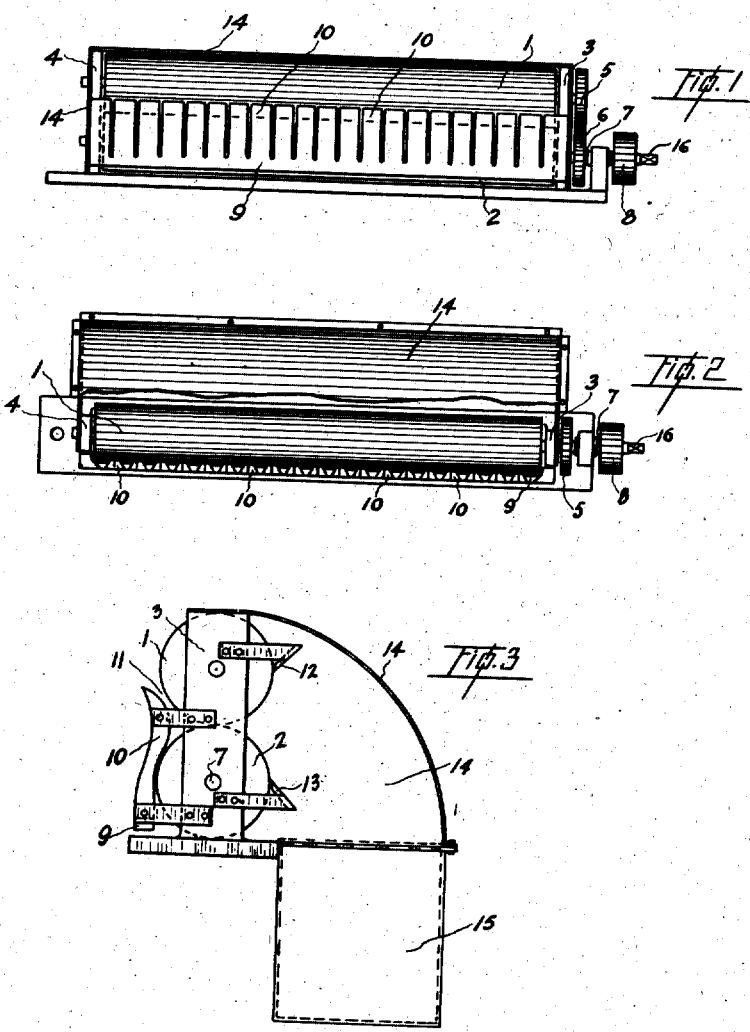

EDWARD FAINT, OF OKANAGAN LANDING, BRITISH COLUMBIA, CANADA.

DEVICE FOR PLUCKING FOWLS.

1,218,174. Specification of Letters Patent. Patented Mar. 6, 1917.

Application filed September 11, 1915. Serial No. 50,190.

*To all whom it may concern:*

Be it known that I, EDWARD FAINT, a subject of the King of Great Britain, and a resident of the town of Okanagan Landing, in the Province of British Columbia, Canada, have invented certain new and useful Improvements in Devices for Plucking Fowls, of which the following is a specification.

My invention relates to improvements in devices for plucking fowls, and the object of my invention is to provide a simple and inexpensive mechanical means for picking the feathers from fowls, preparatory to dressing same for the table or market, in a rapid and efficient manner and which, besides being of great convenience, enables a great deal of time and labor to be saved by its use.

I attain this object by the construction illustrated in the accompanying drawings in which—

Figure 1 is a front view of my device.

Fig. 2 is a plan view of Fig. 1, the hood being shown partly broken away.

Fig. 3 is a side view of the device, enlarged, the near side of the hood being removed.

Similar figures of reference indicate similar parts throughout the several views.

1 and 2 indicate a pair of rollers, disposed one above the other and rotatably mounted in the side brackets 3 and 4.

Secured to the respective rollers at one end and meshing with each other are gears 5 and 6, while the shaft 7 of the lower roller is extended and provided with a motor pulley 8, the end of the shaft being squared as at 16 in Figs. 1 and 2 and adapted to receive a handle, should it be desired to operate the machine by hand.

Extending across the front of the rollers is a comb 9 provided with a plurality of teeth 10, which teeth are substantially triangular in cross section, and disposed so that the apex of each tooth lies adjacent the peripheries of the rollers 1 and 2, as shown in Fig. 2. The comb is secured by any suitable means to the brackets 3 and 4, and is arranged so that the back is just clear of the periphery of roller 2, the points of the teeth being rounded outwardly so as to provide a passage 11 between the upper edge of the comb and the periphery of the roller 1 adjacent thereto. The outer face of the comb formed concave, as shown in Fig. 2, so that the body of the fowl may be held more firmly and steadily thereagainst during the picking operation.

12 and 13 indicate knives, suitably supported from a convenient part of the device so that they will normally bear slightly on the rollers 1 and 2 respectively and scrape off any dust or feathers, thus keeping the rollers clean.

14 indicates a hood of sheet metal, or other suitable material, adapted to inclose the knives 12 and 13 and the inner portions of the rollers 1 and 2, as shown more particularly in Fig. 3, the mouth of the hood being directed downwardly and opening into a suitable receptacle 15, provided for collecting the feathers as they are drawn through the machine.

The device may be operated by hand, by means of a suitable handle mounted on the squared portion 16, but it is preferably driven by a small electric motor, belt-connected to the machine, and the manner in which it operates is as follows:—The machine is started, and the body of the fowl is held against the concave face of the comb 9, when the rapidly revolving rollers 1 and 2 pluck the feathers through the passage 11 and between the teeth of the comb. Most of the smaller feathers pass through the comb, but the larger feathers are directed into the mouth of passage 11 so as to be drawn in between the rollers.

It will be seen that, while the spaces through which the feathers pass are very narrow, the surface of the comb against which the body of the fowl bears is very broad, and thus the danger of tearing the skin is effectually prevented. It is well known that there is little danger of damaging the skin by the plucking out of one feather, but that the damage occurs when a bunch of feathers are torn out, and this is prevented by the use of my comb 9, as the spaces between the teeth of same are such that only one or two feathers can be drawn therethrough at the same time.

What I claim as my invention is:—

1. In a device for plucking fowls, the combination with an upper and a lower roller closely spaced together and means for revolving same, of a member substantially comb like in formation set vertically in front of the lower roller, the points of the teeth of said comb extending above and in front of the lower periphery of the upper roller set outwardly a short distance therefrom and forming an unrestricted passage between the upper edge of said comb and said upper roller.

2. In a device for plucking fowls, the combination with an upper and a lower roller closely spaced together and means for revolving same, of a comb like member having its teeth substantially triangular in cross section set vertically in front of the lower roller with the front surfaces of the teeth facing outwardly, the points of the teeth extending above the lower periphery of the upper roller and spaced therefrom so as to provide a passage between the upper edge of the comb and said roller.

3. In a device for plucking fowls, the combination with an upper and a lower roller closely spaced together and means for revolving same, of a comb like member having its teeth substantially triangular in cross section set vertically in front of the lower roller the apex of each tooth facing inwardly and having its outer face substantially concave in formation, the backs of said teeth toward the point being rounded outwardly and extended above the lower periphery of the upper roller and spaced outwardly therefrom so that a passageway is formed therebetween.

4. For use in a device of the class described, a comb like member adapted to be supported vertically in front of a pair of superposed rollers said member having its teeth substantially triangular in cross section, the apex of each tooth facing inwardly, and having its outwardly facing surface substantially concave in formation, the backs of said teeth toward the points being rounded outwardly whereby a passageway is formed between the upper edge of the comb and the uppermost roller.

Dated at Vancouver, B. C., this 14th day of August, 1915.

EDWARD FAINT.

Witnesses:
JAMES TAYLOR,
ISOBEL D. ORR.